United States Patent [19]

Fogarty et al.

[11] Patent Number: 5,055,729
[45] Date of Patent: Oct. 8, 1991

[54] INTEGRAL WATER-COOLED CIRCUIT RING/BUS BAR ASSEMBLY FOR HIGH FREQUENCY GENERATORS

[75] Inventors: James M. Fogarty, Schenectady; James M. Anderson, Cohoes, both of N.Y.

[73] Assignee: General Electric Company, Schenectady, N.Y.

[21] Appl. No.: 564,638

[22] Filed: Aug. 9, 1990

[51] Int. Cl.[5] ............................................. H02K 3/48
[52] U.S. Cl. ..................................... 310/214; 310/52; 310/71; 310/60 A; 310/260
[58] Field of Search .................. 310/214, 42, 71, 52, 310/54, 61, 60 A, 58, 59, 64, 260

[56] References Cited

U.S. PATENT DOCUMENTS 2,965,775 12/1960 Archer .................................... 310/64
4,254,352 3/1981 Fidei et al. ........................... 310/260
4,982,122 1/1991 Rowe et al. ............................ 310/54

FOREIGN PATENT DOCUMENTS 450533 4/1968 Switzerland ........................ 310/214

Primary Examiner—Steven L. Stephan
Assistant Examiner—Edward H. To
Attorney, Agent, or Firm—Nixon & Vanderhye

[57] ABSTRACT

An improved circuit ring and method of assembly for use in electrical machines, such as power generators, motors and the like, including an integral bus bar for conducting current to a machine terminal. The circuit ring is fabricated from hollow copper tubing of a rectangular cross-section and of a size which will allow electrical circuit leads to be brazed thereto in such a manner as to avoid damage to insulation. Cooling fluid is passed through the tubing so that the rings can be assembled and used in high power density electrical machinery.

17 Claims, 3 Drawing Sheets

FIG. 4A
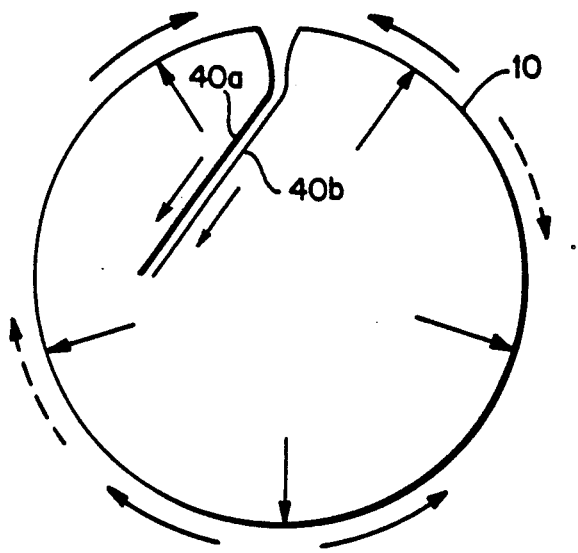
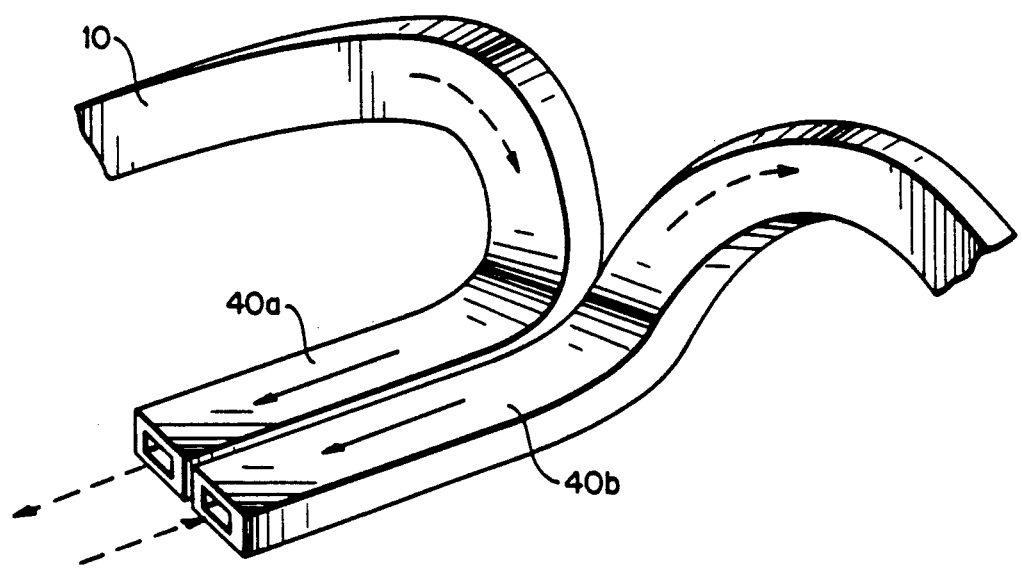
FIG. 4B

INTEGRAL WATER-COOLED CIRCUIT RING/BUS BAR ASSEMBLY FOR HIGH FREQUENCY GENERATORS

FIELD OF THE INVENTION

The invention relates generally to electromagnetic machines such as generators and motors. More specifically the invention disclosed relates to the water cooling of circuit rings in such rotating electrical machinery so as to reduce the size of the rings and to permit brazed electrical connections in place of bolted connections.

BACKGROUND AND SUMMARY OF THE INVENTION

It has long been known that the electromagnetic elements of rotating electrical machinery such as electrical generators and motors incur energy losses during their operation and that the losses are evident by the heat generated within the machine components. It has also been long known to include various mechanisms for removing such heat in order to maintain a normal and efficient energy transformation with such dynamoelectric devices.

It is conventional, for instance, to cool the rotor and stator elements of such devices with air or some other gas flowing through somewhat elaborate cooling ducts incorporated into the rotating machinery elements.

Still other electromagnetic rotating devices have included highly conductive laminations within the core material for the purpose of providing a path of heat conductance to an outer region where the heat may be removed, for example, through the use of forced air flowing over the outer surface of the core material. Other prior art approaches have also been utilized. For example, the concept of using liquid in copper tubing in order to cool electrical conductors is well known and has been employed for many years in large commercial generators. Such tubing, for instance, has been used to form the liquid cooled armature bars and circuit rings of such generators. Although such an approach to cooling presents problems related to maintaining appropriate supplies of dielectric coolant liquids, such an approach offers superior results since the liquid is in direct contact with the copper conductors, thus offering direct cooling whereby the heat passes from the copper directly into the coolant liquid. As will be appreciated, such direct cooling offers a significant advantage over other cooling systems. Such an advantage is useful, particularly in those instances where high power density electrical machinery is desired, since such machinery must be both physically compact and yet have maximum power output.

Although the above noted background pertains primarily to the general design of rotors and stators, such cooling approaches are also applicable to the design of circuit ring-bus bar assemblies, for example, which function to collect electrical current from a number of parallel circuits in an armature winding and conduct that current to a single machine terminal. In dynamoelectric machines there are typically two circuit rings and bus bars for each phase such that a three-phase machine would have six such assemblies, and a six-phase machine would have twelve and so forth. A set of such rings is normally stacked axially at one or both ends of the machine where the circuit leads exit from the armature winding.

In the design of such assemblies it is well known that electrical connections between the rings, leads and bus have the highest reliability when it is possible to braze or solder the conductors. Bolted joints are used where the joint size is sufficiently great as to eliminate brazing or render such techniques impractical. Moreover, a bolted joint is preferred only when it is necessary to frequently disassemble the joint or, as noted above, when other joining techniques are not practical.

When using such bolted joints, the transfer of electrical current relies on the mechanical contact at the interface of a lead connector, for example, and the circuit ring. Efficient and safe current transfer is insured only so long as good mechanical contact is maintained by way of the pressure exerted by the bolts.

In a typical circuit ring-bus bar assembly, current enters the ring at several locations about its periphery by way of leads and connectors bolted to the ring. Thereafter, the current travels around the circuit ring to the bus bar, which is also typically bolted to the ring, but which is significantly larger than any one of the circuit leads. Such ring assemblies are typically attached to a stainless steel shroud which provides mechanical support for the rings by way of electrical insulation which is placed between the rings and the shroud. Although such shrouds may be air or water cooled to provide cooling by thermal conduction from the copper circuit ring such an approach is inferior to the aforementioned direct contact of a cooling liquid with the copper since in the former arrangement the heat must pass through layers of insulation and steel before reaching the coolant. By comparison with direct cooling the heat would pass from the copper directly into the water.

As an additional problem in the design of circuit ring-bus bar assemblies, it is difficult, if not impossible, to braze the circuit lead clips to the circuit ring without damaging insulation between rings. Such damage occurs since the insulation in a stack of rings cannot be moved away from the joint when the brazed connection is being made.

We have discovered that fabricating the rings from hollow copper tubing preferably of a rectangular cross section with the tubing formed into a substantially complete circle, but with the two end portions of the copper tubing formed into an elongated parallel arrangement, offers several advantages with respect to the known prior art.

For example, by applying liquid coolant, such as water, to the construction of the circuit ring conductor such that it enters one parallel end of the tubing and travels circumferentially through the ring to exit at the other parallel end, produces superior cooling and allows the ring size to be reduced, thus allowing brazed electrical connections rather than bolted joints.

A further advantage of this invention is that of fabricating circuit ring-bus bar assemblies in such a manner as to combine the functions of the circuit ring and bus bars into a single assembly, thus eliminating a hydraulic-electrical joint.

A further object and advantage of the invention is that of maintaining a lower average temperature in the conductor, thus improving the reliability of the assembly.

Still further the invention disclosed herein employs direct internal liquid cooling of the circuit rings, thus reducing their size and providing more space from the insulation between adjacent circuit rings to the joint at the circuit lead connection. Such additional space permits the circuit lead connector to be brazed rather than bolted to the circuit ring and additionally makes it possible to reduce the height of the insulation between circuit rings, thus spacing the insulation from the joint and allowing brazing to occur.

Furthermore, in accordance with the disclosed structure and method it is possible to circulate cooling fluid such as air or water through the hollow circuit ring while brazing the circuit lead connectors in order to further assure prevention of damage to the insulation.

This invention provides high power density machinery with enhanced thermal performance. Such machinery may be used in a variety of applications, such as high frequency ship service generators, aerospace generators, drive motors and the like. Still other applications will occur to those skilled in the pertinent art.

These, as well as other objects and advantages of the invention, will be more completely understood and appreciated by careful study of the following description of presently preferred exemplary embodiments taken in conjunction with the accompanying drawings of which:

BRIEF DESCRIPTION OF THE DRAWINGS

FIG. 4A schematically shows copper tubing fabricated in accordance with the present invention to form a combined integral bus bar and circuit ring with solid arrows indicative of electrical current flow and dashed arrows indicative of coolant flow direction;

FIG. 4B shows an exemplary bend of the copper tubing of the circuit ring of FIG. 4A with the parallel ends thereof forming an elongated integral bus bar and with the solid and dashed arrows indicating, respectively, electrical current flow and coolant flow directions;

DETAILED DESCRIPTION OF THE PRESENTLY PREFERRED EXEMPLARY EMBODIMENTS

Figure 1A:
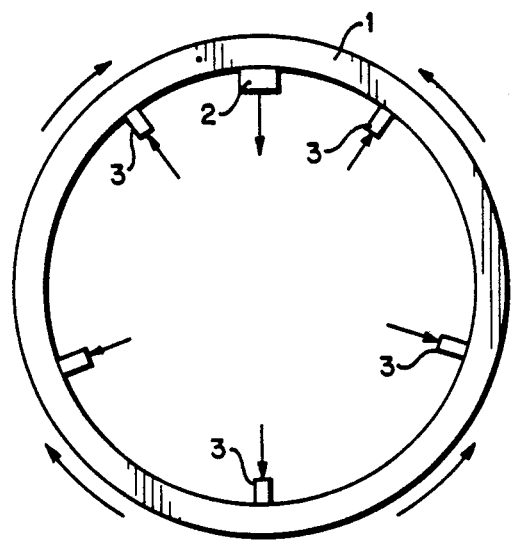
FIG. 1A illustrates the generalized form of a known circuit ring showing the placement of circuit leads in a bus bar tab.
Figure 1B:
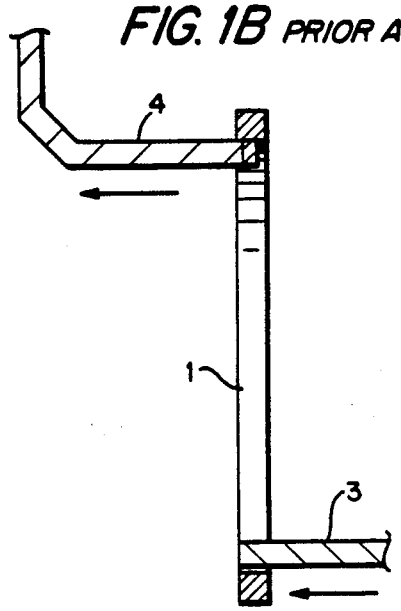
FIG. 1B is a side sectional view of FIG. 1A showing one circuit lead from an armature winding and a bus bar as well as arrows indicating the direction of current flow.

The prior art circuit ring-bus bar assembly generally depicted in FIGS. 1A and 1B illustrate armature winding circuit leads 3 connected, for example, at five peripheral locations on the inner diameter of the circuit ring 1 whereby a number of parallel circuits may conduct current by way of the circuit leads 3 and ring 1 to the bus bar tab 2 in the general directions illustrated by the arrows included in the figures. Where high power density for the electromagnetic rotating machinery is desired, the size of the conductors is such as to dictate away from the use of brazed connections. As a result, bolted joints of the nature illustrated in FIGS. 2A and 2B are utilized notwithstanding the fact that it is well known that electrical connections having the highest reliability are obtained through the use of brazed or welded joints.

Figure 2A:
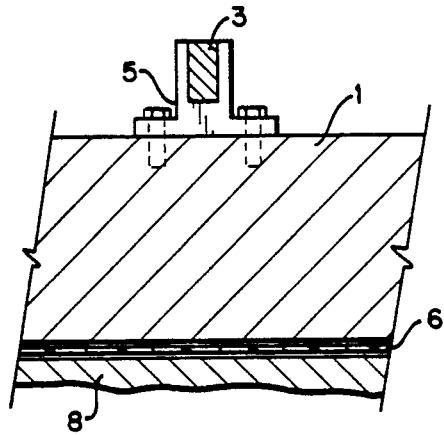
FIGS. 2A and 2B show a partial axial view and a partial side sectional view of a prior art bolted joint connecting a circuit lead and a connecting clip to one of several adjacent circuit rings which are related to other phases of the armature winding.
Figure 2B:
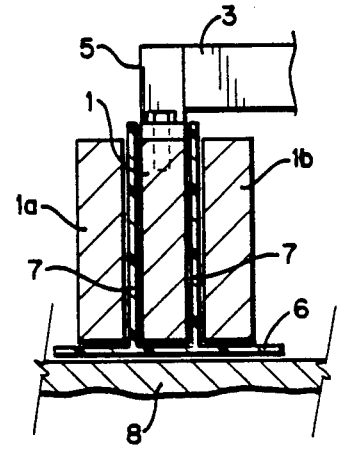

The five circuit leads connect to the circuit ring through bolted connections as shown in FIG. 2A for example, where the circuit lead 3 is brazed to a copper connector or clip 5 which is thereafter bolted onto the circuit ring with a pair of stainless steel bolts. If the interface between the clip and circuit ring is clear of oxides and other contaminants, satisfactory electrical contacts may be maintained so long as the bolts maintain contact pressure at the interface. Such contacts, however, have been known to fail, and it is, therefore, desirable to produce conditions where brazed joints are practical.

Figure 3:
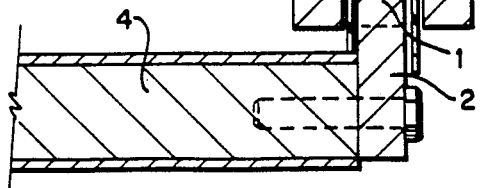
FIG. 3 is a view similar to FIG. 2B but showing the bus bar bolted to the bus bar tab which is integral with the prior art circuit ring.

In the embodiment schematically illustrated in FIGS. 1A and 1B, electrical current travels through the parallel circuits in an armature winding, the circuit leads 3 connected thereto, as well as the copper connector clips 5 and around the circuit ring to the bus bar tab 2 where it enters the bus bar 4 of FIG. 3 through another bolted joint for conduction of current to the generator terminals. In the exemplary embodiment illustrated, the current enters the ring at five places and leaves at one bus bar tab. The bus bar cross sectional area is accordingly significantly greater than any one circuit lead in order to carry this larger current.

The circuit ring illustrated is normally placed at the end of the dynamoelectric machine where connections from the armature windings are obtained. Conventionally, a number of circuit rings (1, 1a and 1b, for example) are stacked side by side, as illustrated in FIG. 2, with electrical insulation (6) placed between the rings and a stainless steel shroud 8 which provides mechanical support for the rings. Electrical insulation 7 is also placed between rings which may be associated with separate phases of a generator or motor, for example.

The aforementioned shroud 8 in the conventional structure illustrated in FIGS. 1 through 3 is water cooled to provide cooling by thermal conduction from the copper circuit ring to the water in the shroud. As aforementioned, however, such an approach to cooling is inferior to cooling by water in direct contact with the copper since in the former arrangement the heat must pass through layers of insulation and steel before it reaches the cooling water. A direct cooling system, however, would cause the heat to pass directly from the copper into the water.

As will be noted from a review of the details illustrated in FIGS. 2A and 2B, the prior art design, wherein the insulation armor 7 between rings cannot be moved away from the connection as the connection is being made, would dictate away from the use of a brazed joint even if the use of such a brazed joint was otherwise practical. That is to say, attempts to use a brazed joint between the circuit ring 3 and circuit lead clip 5 in FIG. 2 would destroy the insulation 7 and lead to failure due to the high temperatures encountered during brazing.

Figure 5C:
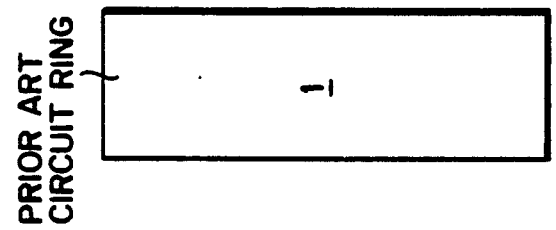
FIG. 5C merely illustrates for comparison purposes the height and shape of an exemplary prior art circuit ring with respect to the height and shape of the present circuit ring of FIG. 5B.
Figure 5B:
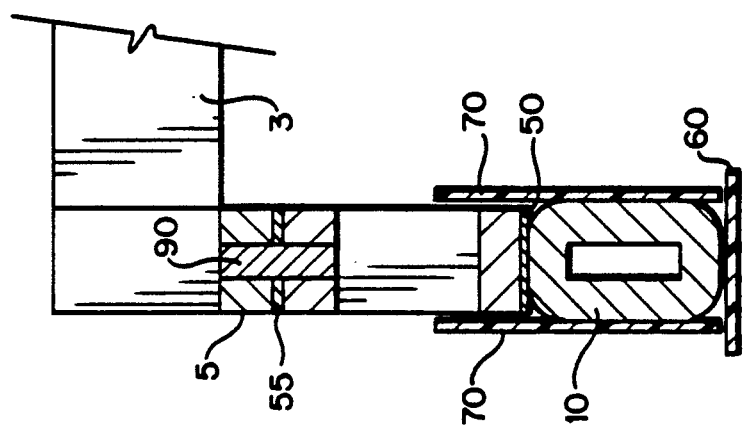
FIG. 5A and 5B show, respectively, a sectional axial view and a sectional circumferential view of the details of a brazed joint between a circuit lead and a circuit ring of the present invention.
Figure 5A:
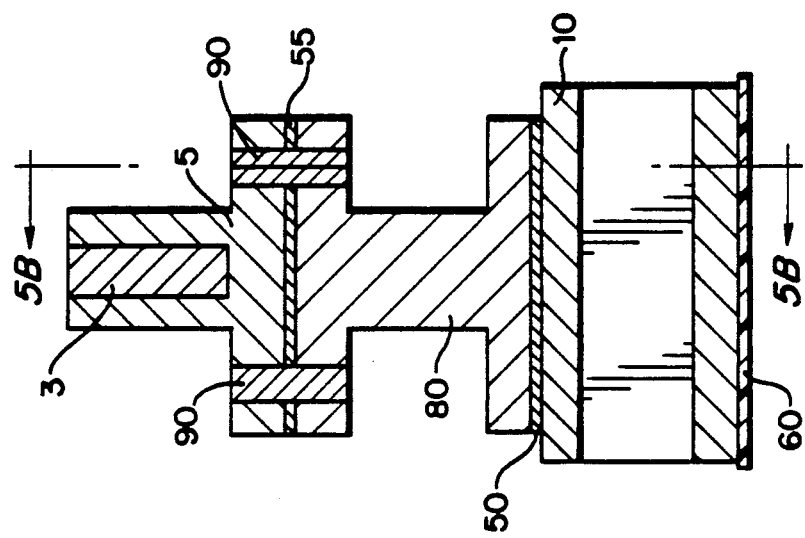

The present invention, however, as generally illustrated in FIGS. 4A and 4B, taken with the additional details found in FIGS. 5A and 5B, indicates that by fabricating the circuit ring 10 using copper tubing that is generally rectangular in cross section and the circuit ring 10 is substantially circular, not only allows the use of direct internal water cooling of the circuit rings but also reduces the size requirements for such rings. The disclosed embodiment, therefore, allows more space between the insulation and the joint at the circuit lead and permits the circuit lead clips to be brazed rather than bolted to the circuit ring. Moreover, as illustrated in FIG. 4B, for example, the tubing ends 40a and 40b form an elongated bus bar integral with the circuit ring thereby eliminating a high current, bolted joint, thus resulting in a single assembly. Although in the presently preferred embodiment the tubing is generally rectangular in cross section, other cross sectional forms may be used.

Still further, the formation of the integral circuit ring-bus bar from hollow copper tubing of a rectangular cross section is in many respects much simpler than machining the prior art circuit rings from copper plates and subsequently forming the bolted joint with the bus bar. As illustrated in FIGS. 4A and 4B, the electric current would continue to enter the ring at a number of peripheral locations by way of connections from the circuit leads. Additionally, the current would continue to peripherally pass around the ring but would exit at the two parallel portions (40a and 40b) of the copper tubing forming the bus bar and without passing through a joint between the bus bar and circuit ring.

As to the coolant, which in the presently preferred embodiment is water, it enters one end of the copper tubing through a hydraulic clip (not shown) and travels circumferentially through the ring exiting at the other end of the tubing such as at 40a into the same hydraulic clip.

FIGS. 5A and 5B illustrate the presently preferred embodiment for forming a joint between the circuit ring and one of the circuit leads. As will be noted by a comparison of the outline shown in FIGS. 5C, the water cooled circuit ring of the present invention is significantly smaller than that of the prior art circuit ring. In forming the joint between the present hollow copper tubing ring and the prior art circuit lead and clip, a copper adaptor 80 is used. Although the adaptor is illustrated as having an "I" shape, it may have any suitable shape and is brazed at 50 to the inner diameter of the circuit ring 10 before placement of the ring and its affixed adaptors in the electromagnetic machine. Since the insulation 60 and 70 is not present when brazing the adaptor to the ring, no high temperature damage to the insulation occurs. Moreover, as will be noted from a comparison of FIGS. 5B and 2B, insulation 70 is substantially shorter than insulation 7 and, therefore, is not located near the brazed joint 55 when the clip 5 is affixed to the copper adaptor 80 after the ring is installed in the machine.

Since the prior art clip 5, which is brazed to the circuit lead 3, is in the present invention brazed to the adaptor, the bolts previously used are replaced with copper locating pins 90 for alignment purposes. Additionally, as will be noted from a review of the details found in FIG. 5B, in comparison with that which is illustrated in FIG. 2B, although insulation 70 is shorter in height than insulation 7, it is nevertheless sufficiently high to insulate one ring from another when stacked in the manner illustrated in FIG. 2B. Insulation 60 performs in substantially the same manner as insulation 6 shown in FIG. 2B. Moreover, since the adaptors 80 of each of the phase circuit rings do not occupy the same peripheral position about the rings, insulating sheets such as 70 need not be provided between the clips or adaptors. As an additional precaution against damaging insulation 70 when forming the brazed joint 55, cooling air or water may be circulated through the hollow circuit ring while brazing the circuit leads and clips to the adaptors.

In summary, it has been known in the past to use copper tubing and liquid coolants to form liquid cooled armature bars and the like in very large commercial generators. As disclosed herein, however, the presently preferred embodiment employs copper tubing in circuit rings in such a manner as to greatly reduce the size of the circuit ring. Moreover, the brazed adaptors disclosed herein form a circuit ring extension to which circuit leads and their clips may be brazed rather than bolted. Additionally the elements can be brazed without risk of damaging the insulation between rings. Still further, the preferred embodiment produces an integral circuit ring and bus bar whereby the single assembly performs the several functions of the prior art elements. Thus, the improved features of the present invention can be readily employed in high power density electrical rotating machinery to obtain the benefits disclosed herein. It is also contemplated that the copper tubing used in this invention may also be used in a beneficial manner in induction heating apparatus where during the operation of such apparatus cooling water is circulated through the tubes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An integral circuit ring-bus bar assembly for use in electrical machinery, said assembly comprising:
    linear, conducting, hollow tubing formed into a substantially complete circular ring with the linearly integral tubing ends forming two parallel bus bar portions for conducting electrical current between said ring and an electrical terminal in said machinery; and
    a plurality of circuit lead connectors affixed about the periphery of said ring for conducting electrical current between said ring and plural circuit leads.

2. An assembly as in claim 1 wherein cooling fluid is passed through the tubing.

3. An assembly as in claim 2 wherein said cooling fluid comprises air or water.

4. An assembly as in claim 1 wherein the tubing material comprises copper.

5. An assembly as in claim 1 wherein said tubing is substantially of rectangular cross-section.

6. An assembly as in claim 1 wherein each of said lead connectors comprise:
    an electrically conductive adaptor joined to said ring periphery;
    an electrically conductive lead clip affixed to said adaptor; and
    a conductive circuit lead joined to said clip.

7. An assembly as in claim 6 wherein the joint between each adaptor and said ring and the joint between each clip and each adaptor comprises a brazed joint.

8. An assembly as in claim 7 wherein the joint between each circuit lead and each clip comprises a brazed joint.

9. An assembly as in claim 1 wherein said connectors are affixed to said ring by means comprising brazed joints.

10. An assembly as in claim 2 wherein said connectors are affixed to said ring by means comprising brazed joints.

11. An assembly as in claim 1 further comprising a plurality of said rings stacked adjacent to each other with insulation between adjacent rings.

12. An assembly as in claim 6 further comprising a plurality of said rings stacked adjacent to each other with insulation between adjacent rings; and
   wherein said insulation extends in a radial direction beyond the joint of the tubing and adaptor, but not as far as the joint between the lead clip and the adaptor.

13. Improved rotating electrical machinery including a cylindrical rotor rotatable about a central axis and a stator having windings with plural circuit leads connected thereto, the opposite end of said circuit leads being connected to plural circuit rings, said machinery further including electrical current conducting terminals and plural bus bars each connecting a circuit ring to a single terminal, the improvement comprising:
   hollow electrically conducting tubing fabricated into substantially complete circular rings each with elongated integral tubing ends forming substantially parallel portions, each fabricated ring forming one of said circuit rings and said elongated tubing end portions forming one of said bus bars; and
   a plurality of connector joints comprising brazed joints located about the periphery of each said circuit ring, each said connector joint connecting one of said circuit leads to one of said rings, and wherein each said connector joint includes an electrically conductive adaptor joined to said ring periphery, and electrically conductive lead clip joined to said adaptor and a conductive circuit lead joined to said clip.

14. The improved machinery of claim 13 further comprising cooling fluid passing through each of said bus bars and rings.

15. The improved machinery of claim 13 wherein the tubing material comprises copper and the tubing is of substantially rectangular cross-section.

16. The improved machinery of claim 13 wherein said plurality of rings are stacked adjacent to each other with insulation between adjacent rings.

17. The improved machinery of claim 13 wherein said plurality of rings are stacked adjacent to each other with insulation between adjacent rings; and
   wherein said insulation extends in a radial direction beyond the joint of the tubing and adaptor, but not as far as the joint between the lead clip and the adaptor.

* * * * *